US012775575B2

(12) United States Patent
Yamahara

(10) Patent No.: US 12,775,575 B2
(45) Date of Patent: Oct. 27, 2026

(54) TRANSMISSION CIRCUIT, RECEPTION CIRCUIT, TRANSMISSION AND RECEPTION CIRCUIT, AND COMMUNICATION DEVICE

(71) Applicant: Kioxia Corporation, Tokyo (JP)

(72) Inventor: Yosuke Yamahara, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 34 days.

(21) Appl. No.: 19/071,858

(22) Filed: Mar. 6, 2025

(65) Prior Publication Data

US 2026/0079873 A1 Mar. 19, 2026

(30) Foreign Application Priority Data

Sep. 18, 2024 (JP) ................................. 2024-161122

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
USPC ........................................................... 710/29
See application file for complete search history.

(56) References Cited

U.S. PATENT DOCUMENTS 7,020,393 B2 * 3/2006 Schaller ............. H04Q 11/0062 398/16
11,736,596 B1 8/2023 Siva et al.
12,132,520 B1 * 10/2024 Ma ......................... H04B 10/40
2002/0118413 A1 * 8/2002 Yamada .................. H04L 12/46 398/58
2004/0202118 A1 * 10/2004 Yagawa .............. H04W 88/085 370/320
2010/0070673 A1 * 3/2010 Jung ................... G06F 13/4045 710/313
2011/0116807 A1 * 5/2011 Park ..................... H04B 10/801 398/164
2013/0268713 A1 * 10/2013 Choi ................... G06F 13/4022 710/313
2016/0087723 A1 3/2016 Zhang et al.
2017/0026115 A1 1/2017 He et al.
2019/0215065 A1 * 7/2019 Fairweather ............ H02J 50/20
2022/0200827 A1 * 6/2022 Chen ................. H04L 25/03343
2023/0144056 A1 * 5/2023 Miglani ............... G02B 6/3518 710/105
2025/0162427 A1 * 5/2025 Gardes .................... B60L 50/52
2026/0030193 A1 * 1/2026 Jeong .................. G06F 13/4221
2026/0058727 A1 * 2/2026 Haas .................... H04B 10/114
2026/0121753 A1 * 4/2026 Zhao .................... H04B 10/501

* cited by examiner

*Primary Examiner* — Christopher B Shin
(74) *Attorney, Agent, or Firm* — Maier & Maier, PLLC

(57) ABSTRACT

An interface is compliant with a first standard specifying transmission of a signal in a serial format, and is configured to receive an electrical signal in the serial format. A control circuit is configured to output a first issuance instruction upon detecting that a first command for instructing a device compliant with the first standard to switch to an idle state is received by the interface. A photoelectric conversion device is configured to convert a received electrical signal into an optical signal and output the optical signal, and, upon receiving the first issuance instruction, output a second command which indicates instruction to switch to the idle state and is in a form of an optical signal.

18 Claims, 10 Drawing Sheets

TRANSMISSION CIRCUIT, RECEPTION CIRCUIT, TRANSMISSION AND RECEPTION CIRCUIT, AND COMMUNICATION DEVICE

CROSS-REFERENCE TO RELATED APPLICATIONS

This application is based upon and claims the benefit of priority from Japanese Patent Application No. 2024-161122, filed Sep. 18, 2024, the entire contents of which are incorporated herein by reference.

FIELD

Embodiments described herein relate generally to a transmission circuit, a reception circuit, a transmission and reception circuit, and a communication device.

BACKGROUND

Devices that communicate with each other via an interconnect are required to have a higher communication speed. To increase communication speed, optical signals may be used. Due to the characteristics of optical signals, simple conversion of electrical signal to an optical signal may not realize normal function.

DETAILED DESCRIPTION

Figure 1:
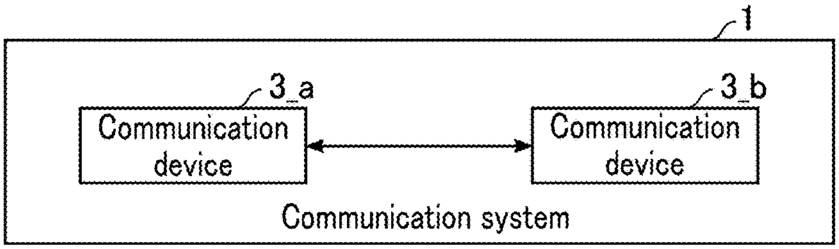
FIG. 1 is a block diagram of a communication system including a transmission circuit and a reception circuit according to a first embodiment.

In general, according to one embodiment, a transmission circuit includes an interface; a control circuit, and a photoelectric conversion device. The interface is compliant with a first standard specifying transmission of a signal in a serial format, and is configured to receive an electrical signal in the serial format. The control circuit is configured to output a first issuance instruction upon detecting that a first command for instructing a device compliant with the first standard to switch to an idle state is received by the interface. The photoelectric conversion device is configured to convert a received electrical signal into an optical signal and output the optical signal, and, upon receiving the first issuance instruction, output a second command which indicates instruction to switch to the idle state and is in a form of an optical signal.

Embodiments will now be described with reference to the figures. In order to distinguish components having substantially the same function and configuration in an embodiment or over different embodiments from each other, an additional numeral or letter may be added to the end of each reference numeral or letter.

The specification and the claims, when mentioning that a particular (first) component is "coupled" or "connected" to another (second) component, intend to cover both the form of the first component directly coupled or connected to the second component and the form of the first component coupled or connected to the second component via one or more components which are always or selectively conductive.

1. First Embodiment

1.1. Configuration

FIG. 1 is a block diagram of a communication system including a transmission circuit and a reception circuit according to a first embodiment. As shown in FIG. 1, a communication system 1 includes a plurality of communication devices 3 (3_*a* and 3_*b*). Each communication device 3 includes a transmission circuit and a reception circuit as described later. The communication devices 3 are configured to be able to communicate with each other. The communication devices 3 are configured to be able to communicate with each other using optical signals. The communication devices 3 are configured to be able to communicate with each other using optical signals by an optical communication scheme compliant with any selected standard.

Figure 2:
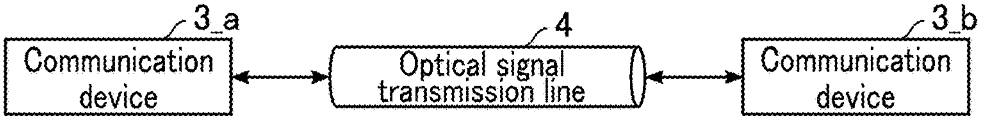
FIG. 2 illustrates a mode of coupling of communication devices including the transmission circuit and the reception circuit of the first embodiment.

FIG. 2 illustrates a mode of coupling of communication devices including the transmission circuit and the reception circuit of the first embodiment. As shown in FIG. 2, the communication devices 3 are coupled to each other via an optical signal transmission line 4. The optical signal transmission line 4 is configured to be able to transmit an optical signal. In one example, the optical signal transmission line 4 transmits a differential signal. Examples of the optical signal transmission line 4 include optical fibers. The optical signal transmission line 4 may be included in the communication system 1.

Figure 3:
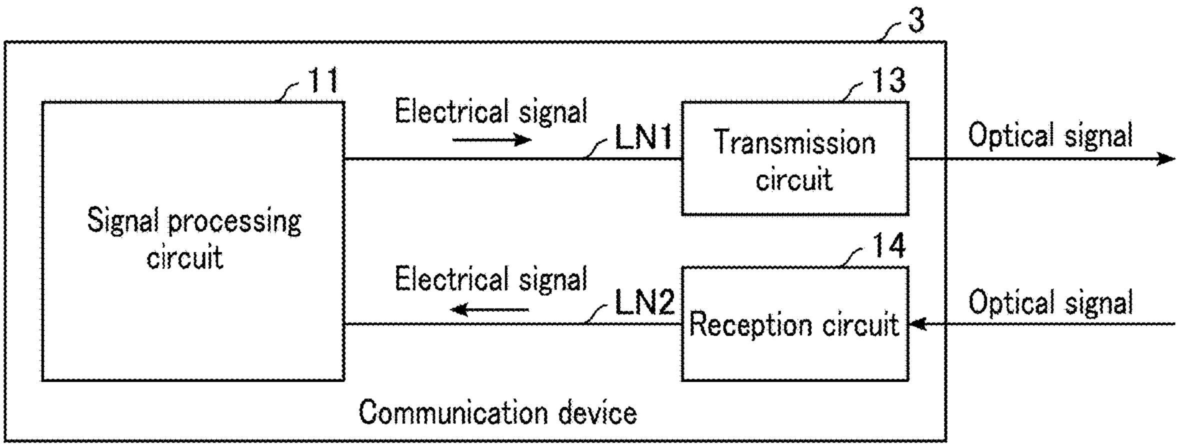
FIG. 3 is a block diagram of a communication device including the transmission circuit and the reception circuit according to the first embodiment.

FIG. 3 is a block diagram of a communication device including the transmission circuit and the reception circuit according to the first embodiment. As shown in FIG. 3, the communication device 3 includes a signal processing circuit 11, a transmission circuit 13, and a reception circuit 14. In one example, the signal processing circuit 11, the transmission circuit 13, and the reception circuit 14 are included in one device included in one housing. In another example, the signal processing circuit 11 and a set of the transmission circuit 13 and the reception circuit 14 are respectively included in independent devices.

The signal processing circuit 11 is a circuit that processes data and signals. The signal processing circuit 11 includes a central processing unit (CPU). The signal processing circuit 11 processes various signals, receives an electrical signal, and outputs an electrical signal. The signal processing circuit 11 can transmit an electrical signal compliant with a serial interface standard. Examples of serial interfaces include peripheral component interconnect express™ (PCIe™). The following description is based on this example. The signal processing circuit 11 can transmit an electrical signal compliant with the PCIe standard, and recognize and interpret the electrical signal. The electrical signal compliant with the PCIe standard has a serial format. The electrical signal compliant with the PCIe standard transfers information by switching between two potentials of different magnitudes (which are a high potential and a low potential). The electrical signal compliant with the PCIe standard transmits (or carries) PCIe data and a clock. The PCIe data is data desired to be communicated by a user of the communication device 3 or a device that controls the communication device 3, and includes substantive data such as parameters and commands. The clock indicates timings of transmission and fetching of the PCIe data. The clock is superimposed on the PCIe data.

The transmission circuit 13 is a circuit that receives an electrical signal, and transmits an optical signal based on the received electrical signal. The transmission circuit 13 converts the received electrical signal into the optical signal, and outputs the obtained optical signal. The transmission circuit 13 can be coupled to the optical signal transmission line 4, and outputs an optical signal toward the optical signal transmission line 4. The transmission circuit 13 can recognize and interpret an electrical signal compliant with the PCIe standard. The transmission circuit 13 converts the electrical signal compliant with the PCIe standard into an optical signal of an optical communication scheme with which the communication device 3 is compliant, and outputs the obtained optical signal. The transmission circuit 13 is coupled to the signal processing circuit 11 by an interconnect LN1, and receives an electrical signal flowing in the interconnect LN1. The interconnect LN1 is compliant with the PCIe standard, and transmits a differential signal.

The reception circuit 14 is a circuit that receives an optical signal, and transmits an electrical signal based on the received optical signal. The reception circuit 14 converts a received optical signal into the electrical signal, and outputs the obtained electrical signal. The reception circuit 14 can be coupled to the optical signal transmission line 4, and receives the optical signal from the optical signal transmission line 4. The reception circuit 14 can generate the electrical signal compliant with the PCIe standard. The reception circuit 14 converts the optical signal of an optical communication scheme with which the communication device 3 is compliant into an electrical signal compliant with the PCIe standard, and outputs the obtained electrical signal. The reception circuit 14 is coupled to the signal processing circuit 11 by an interconnect LN2, and outputs the electrical signal to the interconnect LN2. The interconnect LN2 is compliant with the PCIe standard, and transmits a differential signal.

Hereinafter, an electrical signal compliant with the PCIe standard may be referred to as a PCIe signal.

Figure 4:
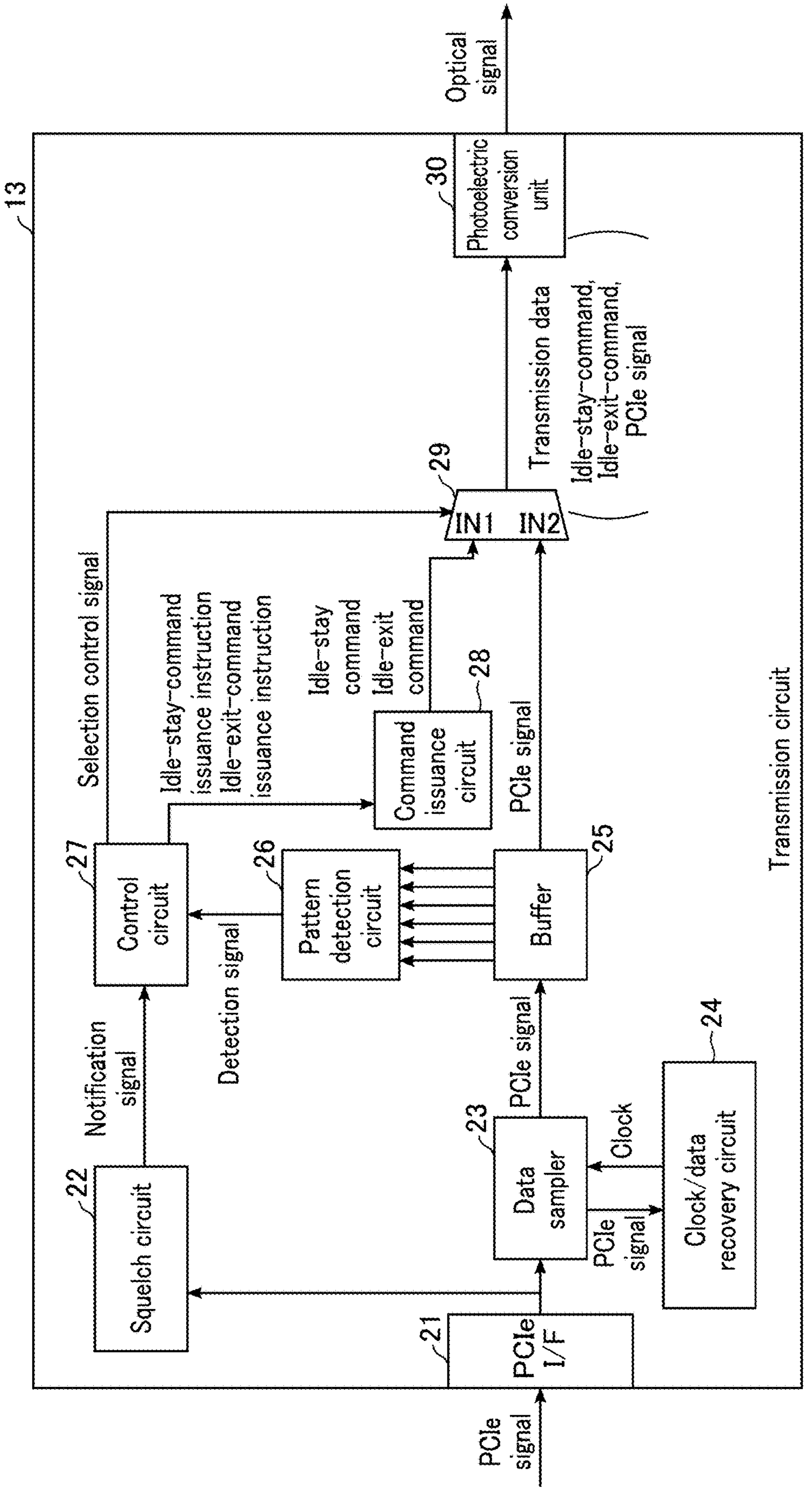
FIG. 4 is a block diagram of the transmission circuit according to the first embodiment.

FIG. 4 is a block diagram of the transmission circuit according to the first embodiment. As shown in FIG. 4, the transmission circuit 13 includes a PCIe interface 21, a squelch circuit 22, a data sampler 23, a clock/data recovery circuit 24, a buffer 25, a pattern detection circuit 26, a control circuit 27, a command issuance circuit 28, a multiplexer 29, and a photoelectric conversion unit 30.

The PCIe interface 21 is a component including a circuit, a terminal, and firmware for receiving the PCIe signal. The PCIe interface 21 includes a terminal compliant with the PCIe standard. The PCIe interface 21 can be coupled to an interconnect (or a connector) compliant with the PCIe standard by the terminal. The PCIe interface 21 can be physically and electrically coupled to another device compliant with the PCIe standard by the interconnect. The PCIe interface 21 is coupled to the signal processing circuit 11 by the interconnect LN1. The PCIe interface 21 receives the PCIe signal from the signal processing circuit 11. The PCIe signal may be superimposed with unintended noise. The PCIe interface 21 may continue to receive noise while no PCIe signal is received.

The squelch circuit 22 is a circuit that performs squelching, and is a circuit that removes noise in a case where the squelch circuit 22 receives noise without receiving any signal. The squelch circuit 22 receives, from the PCIe interface 21, the PCIe signal received by the PCIe interface 21. While the PCIe interface 21 is receiving no PCIe signal, the squelch circuit 22 sometimes receives noise. In a case where the PCIe interface 21 and the squelch circuit 22 receive noise, the squelch circuit 22 removes the noise by performing squelching, and does not output any signal. While the PCIe interface 21 and the squelch circuit 22 are receiving no PCIe signal, the squelch circuit 22 does not output the notification signal NS. Upon receiving the PCIe signal while the PCIe interface 21 and the squelch circuit 22 are receiving no PCIe signal, the squelch circuit 22 outputs a notification signal NS.

The data sampler 23 receives the PCIe signal from the PCIe interface 21 and a clock from the clock/data recovery circuit 24. The data sampler 23 performs sampling on the received PCIe signal, using the received clock. The data sampler 23 extracts PCIe data from the received PCIe signal by the sampling. The PCIe data is extracted from the PCIe signal based on the clock, and has a series of bits that can be recognized as data by the pattern detection circuit 26. The data sampler 23 outputs the PCIe signal in the form of a series of bits that can be recognized as PCIe data.

The clock/data recovery circuit 24 is a circuit that extracts a clock from data on which the clock is superimposed. The clock/data recovery circuit 24 receives the PCIe signal from the data sampler 23, and extracts the clock superimposed on the received PCIe signal. The clock/data recovery circuit 24 supplies the extracted clock to the data sampler 23.

The buffer 25 is a circuit that temporarily stores received data. The buffer 25 receives, from the data sampler 23, the PCIe signal in the form of the series of bits that can be recognized as PCIe data. The buffer 25 stores the received series of bits in order in which the series of bits are received. The buffer 25 outputs the received series of bits in order in which the series of bits are received. In other words, the buffer 25 stores and outputs data in a first-in-first-out (FIFO) principle. The buffer 25 includes a plurality of registers that store the values of the respective bits.

The pattern detection circuit 26 is a circuit that monitors data, and detects a specific pattern from the data. The pattern detection circuit 26 is coupled to an output of each register in the buffer 25. The pattern detection circuit 26 sequentially acquires parallel PCIe data by repeatedly acquiring data that is serially supplied and is stored across the plurality of the registers in the buffer 25. The pattern detection circuit 26 constantly monitors the PCIe data stored in the buffer 25, and, in a case where the PCIe data includes an electrical idle ordered set (EIOS) command (or a packet), detects the EIOS command. Upon detecting the EIOS command, the pattern detection circuit 26 outputs a detection signal DS. The EIOS command is defined by the PCIe standard, and is used by devices compliant with the PCIe standard. Hereinafter, a device compliant with the PCIe standard, including the communication devices 3, may be referred to as a PCIe device. If the PCIe device is ready to enter an L1 state, the PCIe device transmits the EIOS command to another PCIe device with which it communicates, and enters the L1 state. The PCIe device that has received the EIOS command also enters the L1 state. While in the L1 state, the PCIe device is in an electrical idle state, and consumes less power than power to be consumed in an L0 state in which the PCIe device can transmit and receive data.

The control circuit 27 is a circuit that controls switching between the L1 state and a state other than the L1 state of another communication device 3 that communicates with the communication device 3 including the transmission circuit 13. Upon receiving the detection signal DS from the pattern detection circuit 26, the control circuit 27 performs control to instruct another communication device 3 communicating with the communication device 3 including the transmission circuit 13, to enter the L1 state. Upon receiving the detection signal DS, the control circuit 27 outputs an idle-stay-command issuance instruction EI.

The control circuit 27 receives the notification signal NS from the squelch circuit 22. Once receiving the detection signal DS, the control circuit 27 outputs the idle-stay-command issuance instruction EI continuously or repeatedly at regular intervals until receiving the notification signal NS. Upon receiving the notification signal NS after once receiving the detection signal DS, the control circuit 27 stops outputting the idle-stay-command issuance instruction EI, and outputs an idle-exit-command issuance instruction LI.

The control circuit 27 outputs a selection control signal CS1. The selection control signal CS1 can have at least two values, and, in one example, indicates two different values in one bit. The selection control signal CS1 has a first value while the communication device 3 including the transmission circuit 13 is in a normal mode, or, in other words, until the control circuit 27 receives the detection signal DS. The normal mode is a mode while the communication device 3 is in a state other than the L1 state. The first value indicates the normal mode. The selection control signal CS1 has a second value while the communication device 3 including the transmission circuit 13 is in an L1 mode, or, in other words, until the control circuit 27 receives the notification signal NS after receiving the detection signal DS. The L1 mode is a mode while the communication device 3 is in the L1 state. The second value indicates the L1 mode.

The command issuance circuit 28 is a circuit that generates and outputs an idle-stay command (or a packet) EC and an idle-exit command (or a packet) LC. The idle-stay command EC and the idle-exit command LC are electrical signals, and have a serial format. The idle-stay command EC has a series of a plurality of bits, and values of the series of bits have a pattern inherent (or unique) to the idle-stay command EC. The idle-exit command LC has a series of a plurality of bits, and values of the series of bits have a pattern inherent (or unique) to the idle-exit command LC.

While continuing to receive the idle-stay-command issuance instruction EI, the command issuance circuit 28 outputs the idle-stay command EC continuously or repeatedly at regular intervals. Alternatively, the command issuance circuit 28 outputs the idle-stay command EC every time receiving the idle-stay-command issuance instruction EI. Upon receiving the idle-exit-command issuance instruction LI, the command issuance circuit 28 outputs the idle-exit command LC.

The multiplexer 29 is coupled to an output of the command issuance circuit 28 at an input IN1 thereof. The multiplexer 29 is coupled to an output of the buffer 25 at an input IN2 thereof. The multiplexer 29 receives the selection control signal CS1 from the control circuit 27. While receiving the selection control signal CS1 having the value indicating the normal mode, the multiplexer 29 couples the input IN2 to an output of the multiplexer 29. As a result, during the normal mode, or until the control circuit 27 receives the detection signal DS, the multiplexer 29 outputs the PCIe signal received from the buffer 25. On the other hand, while receiving the selection control signal CS1 having the value indicating the L1 mode, the multiplexer 29 couples the input IN1 to the output of the multiplexer 29. As a result, during the L1 mode, or during a period from the receipt of the detection signal DS till the receipt of the notification signal NS by the control circuit 27, the multiplexer 29 outputs the idle-stay command EC or the idle-exit command LC. Hereinafter, a signal that is output from the multiplexer 29 will be referred to as transmission data in some cases.

The photoelectric conversion unit 30 is a unit including a circuit that converts an electrical signal received by the photoelectric conversion unit 30 into an optical signal. The photoelectric conversion unit 30 includes a connector that can be coupled to the optical signal transmission line 4. The photoelectric conversion unit 30 receives transmission data from the multiplexer 29. The photoelectric conversion unit 30 converts the received transmission data into an optical signal, and outputs the obtained optical signal. The photoelectric conversion unit 30 is also referred to as the photoelectric conversion device. The photoelectric conversion unit 30 is also referred to as an electro-optical conversion unit or an electro-optical conversion device.

Figure 5:
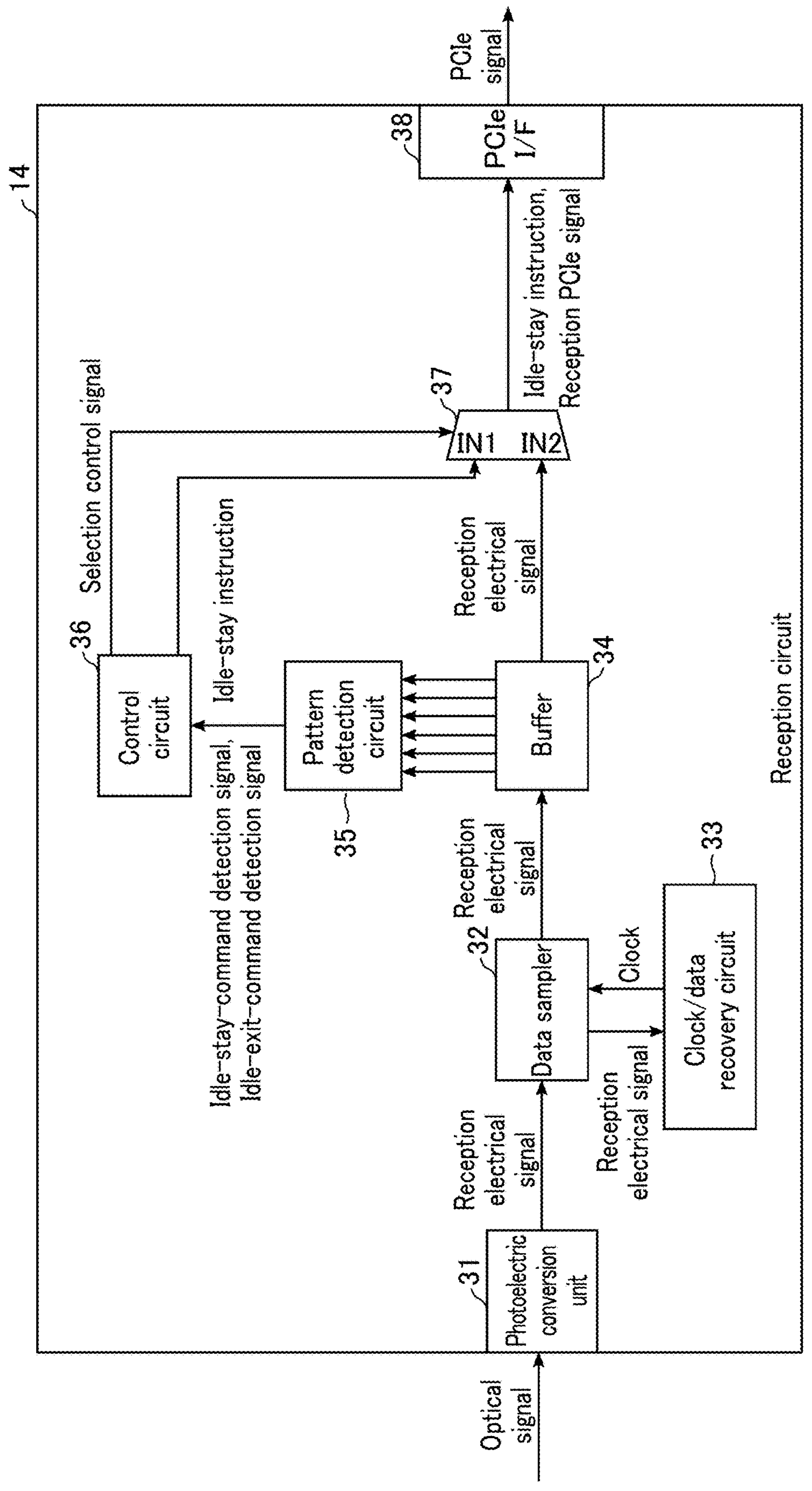
FIG. 5 is a block diagram of the reception circuit according to the first embodiment.

FIG. 5 is a block diagram of the reception circuit according to the first embodiment. As shown in FIG. 5, the reception circuit 14 includes a photoelectric conversion unit 31, a data sampler 32, a clock/data recovery circuit 33, a buffer 34, a pattern detection circuit 35, a control circuit 36, a multiplexer 37, and a PCIe interface 38.

The photoelectric conversion unit 31 is a unit including a circuit that converts an optical signal received by the photoelectric conversion unit 31 into an electrical signal. The photoelectric conversion unit 31 includes a connector that can be coupled to the optical signal transmission line 4. The photoelectric conversion unit 31 receives an optical signal from a communication device 3 different from the communication device 3 including the reception circuit 14. The photoelectric conversion unit 31 converts a received optical signal into an electrical signal, and outputs the obtained electrical signal. The output electrical signal may be referred to as a reception electrical signal. The reception electrical signal includes reception data on which a clock is superimposed. The reception data is the same as transmission data generated in another communication device 3 that has transmitted the optical signal to the communication device 3 including the reception circuit 14, and includes the PCIe signal, the idle-stay command EC, or the idle-exit command LC. The photoelectric conversion unit 31 is also referred to as the photoelectric conversion device.

The data sampler 32 receives the reception electrical signal from the photoelectric conversion unit 31 and a clock from the clock/data recovery circuit 33. The data sampler 32 performs sampling on the received reception electrical signal, using the received clock. The data sampler 32 extracts the reception data from the received reception electrical signal by the sampling. The data sampler 32 outputs the extracted reception data as a reception electrical signal. The extracted reception data includes a series of bits that can be recognized as PCIe data, the idle-stay command EC, or the idle-exit command LC.

The clock/data recovery circuit 33 is a circuit that extracts a clock from data on which the clock is superimposed. The clock/data recovery circuit 33 receives the reception electrical signal from the data sampler 32, and extracts the clock superimposed on the received reception electrical signal. The clock/data recovery circuit 33 supplies the extracted clock to the data sampler 32.

The buffer 34 is a circuit that temporarily stores received data. The buffer 34 receives, from the data sampler 32, the reception electrical signal in the form of a series of bits that can be recognized as reception data. The buffer 34 stores the received series of bits in order in which the series of bits are received. The buffer 34 outputs the received series of bits in order in which the series of bits are received. In other words, the buffer 34 stores and outputs data in the FIFO principle. The buffer 34 includes a plurality of registers that store the values of the respective bits.

The pattern detection circuit 35 is a circuit that monitors data, and detects a specific pattern from the data. The pattern detection circuit 35 is coupled to an output of each register in the buffer 34. The pattern detection circuit 35 sequentially acquires parallel reception data by repeatedly acquiring data that is serially supplied and is stored across the plurality of the registers in the buffer 34. The pattern detection circuit 35 constantly monitors the reception data stored in the buffer 34, and, in a case where the reception data includes the idle-stay command EC and the idle-exit command LC, detects the idle-stay command EC and the idle-exit command LC. Upon detecting the idle-stay command EC, the pattern detection circuit 35 outputs an idle-stay-command detection signal XDS. Upon detecting the idle-exit command LC, the pattern detection circuit 35 outputs an idle-exit-command detection signal LDS.

The control circuit 36 is a circuit that controls switching between the L1 state and a state other than the L1 state of the communication device 3 including the reception circuit 14. Upon receiving the idle-stay-command detection signal XDS from the pattern detection circuit 35, the control circuit 36 outputs an idle-stay instruction SI.

The control circuit 36 outputs a selection control signal CS2. The selection control signal CS2 can have at least two values, and, in one example, indicates two different values in one bit. The selection control signal CS2 has a first value while the communication device 3 including the reception circuit 14 is in the normal mode, or, in other words, until the control circuit 36 receives the idle-stay-command detection signal XDS. The first value indicates the normal mode. Once receiving the idle-stay-command detection signal XDS, the control circuit 36 continues to output the selection control signal CS2 of a second value until receiving the idle-exit-command detection signal LDS. The second value indicates the L1 mode. Upon receiving the idle-exit-command detection signal LDS, the control circuit 36, which has been outputting the selection control signal CS2 of the second value, starts outputting the selection control signal CS2 of the first value after a certain period of time from the receipt.

The multiplexer 37 is coupled to an output of the control circuit 36 at an input IN1 thereof. The multiplexer 37 is coupled to an output of the buffer 34 at an input IN2 thereof. The multiplexer 37 receives the selection control signal CS2 from the control circuit 36. While receiving the selection control signal CS2 having the value indicating the normal mode, the multiplexer 37 couples the input IN2 to an output of the multiplexer 37. As a result, during the normal mode, the multiplexer 37 outputs the reception electrical signal received from the buffer 34. While receiving the selection control signal CS2 having the value indicating the L1 mode, the multiplexer 37 couples the input IN1 to the output of the multiplexer 37. As a result, during the L1 mode, the multiplexer 37 outputs the idle-stay instruction SI.

The PCIe interface 38 is a component including a circuit, a terminal, and firmware for transmitting a PCIe signal. The PCIe interface 38 includes a terminal compliant with the PCIe standard. The PCIe interface 38 can be coupled to an interconnect (or a connector) compliant with the PCIe standard by the terminal. The PCIe interface 38 can be physically and electrically coupled to another device compliant with the PCIe standard by the interconnect. The PCIe interface 38 is coupled to the signal processing circuit 11 by the interconnect LN2. The PCIe interface 38 transmits the PCIe signal to the signal processing circuit 11.

1.2. Operations

Figure 6:
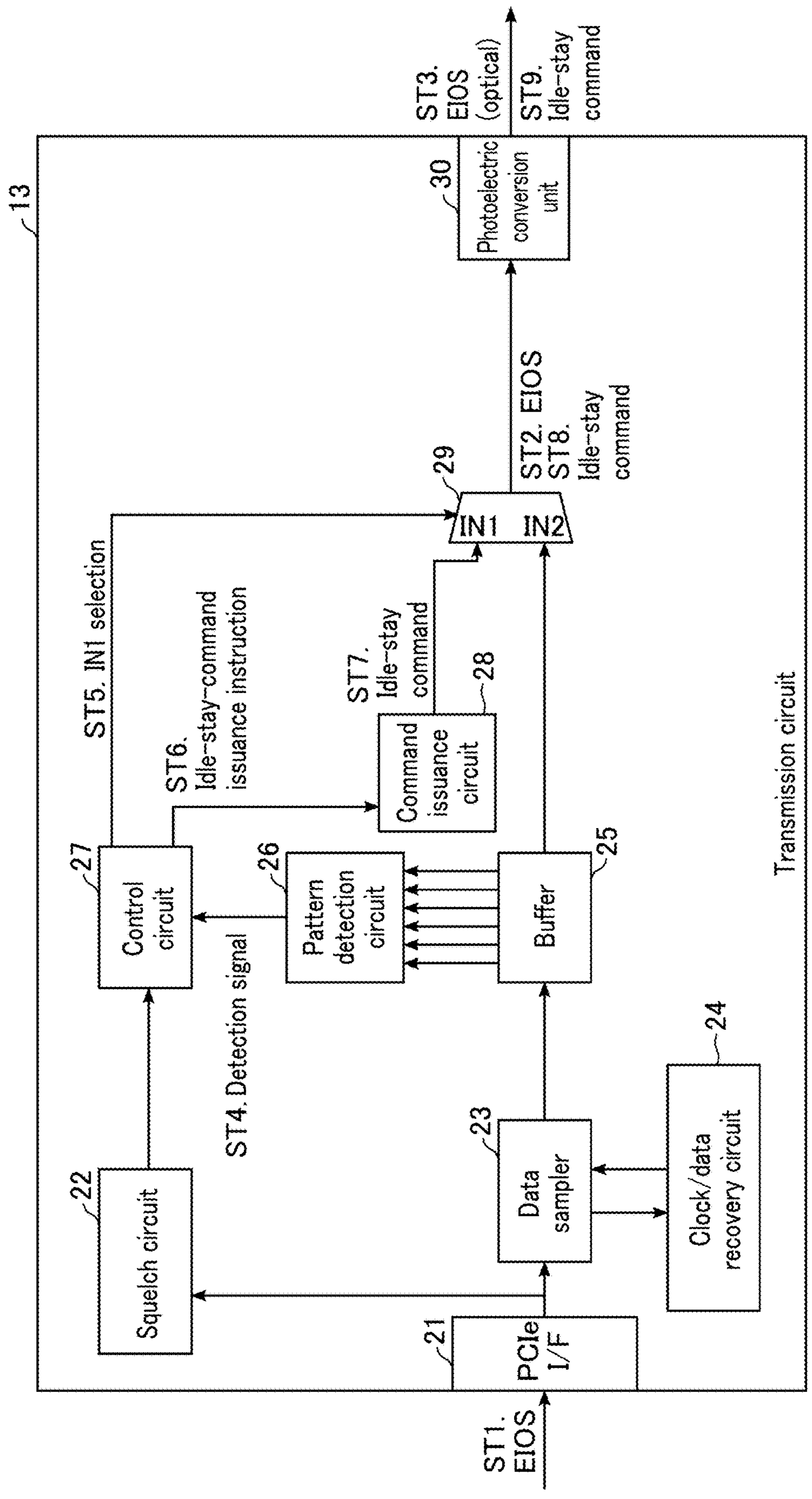
FIG. 6 illustrates signals that are transmitted and received during an operation of the transmission circuit of the first embodiment.

FIG. 6 illustrates signals that are transmitted and received during an operation of the transmission circuit of the first embodiment. The operation illustrated in FIG. 6 starts when the signal processing circuit 11 coupled to the transmission circuit 13 outputs the EIOS. At the time of the start of the operation illustrated in FIG. 6, the multiplexer 29 has selected the input IN2.

As illustrated in FIG. 6, the transmission circuit 13 receives the EIOS (ST1).

The received EIOS is output from the multiplexer 29 (ST2).

Upon receiving the EIOS, the photoelectric conversion unit 30 outputs the EIOS in the form of an optical signal (ST3).

As the EIOS output from the signal processing circuit 11 is received by the transmission circuit 13, the pattern detection circuit 26 detects the receipt of the EIOS. By the detection, the pattern detection circuit 26 outputs the detection signal DS (ST4).

Upon receiving the detection signal DS, the control circuit 27 outputs the selection control signal CS1 indicating selection of the input IN1 (ST5).

Upon receiving the detection signal DS, the control circuit 27 outputs the idle-stay-command issuance instruction EI (ST6). ST6 may be performed in parallel with ST5.

Upon receiving the idle-stay-command issuance instruction EI, the command issuance circuit 28 issues the idle-stay command EC (ST7). The idle-stay command EC is received by the photoelectric conversion unit 30 via the multiplexer 29 (ST8).

Upon receiving the idle-stay command EC, the photoelectric conversion unit 30 outputs the idle-stay command EC in the form of an optical signal (ST9). The idle-stay command EC is a command in the form of the optical signal that can be recognized by the reception circuit 14, and is different from the EIOS.

Once the EIOS is received in ST1, the control circuit 27 continues to output the selection control signal CS1 indicating selection of the input IN1 and repeatedly outputs the idle-stay-command issuance instruction EI until an electrical idle exit ordered set (EIEOS) is received. Thus, the idle-stay command EC in the form of the optical signal continues to be transmitted after the EIOS is received until the EIEOS is received.

Figure 7:
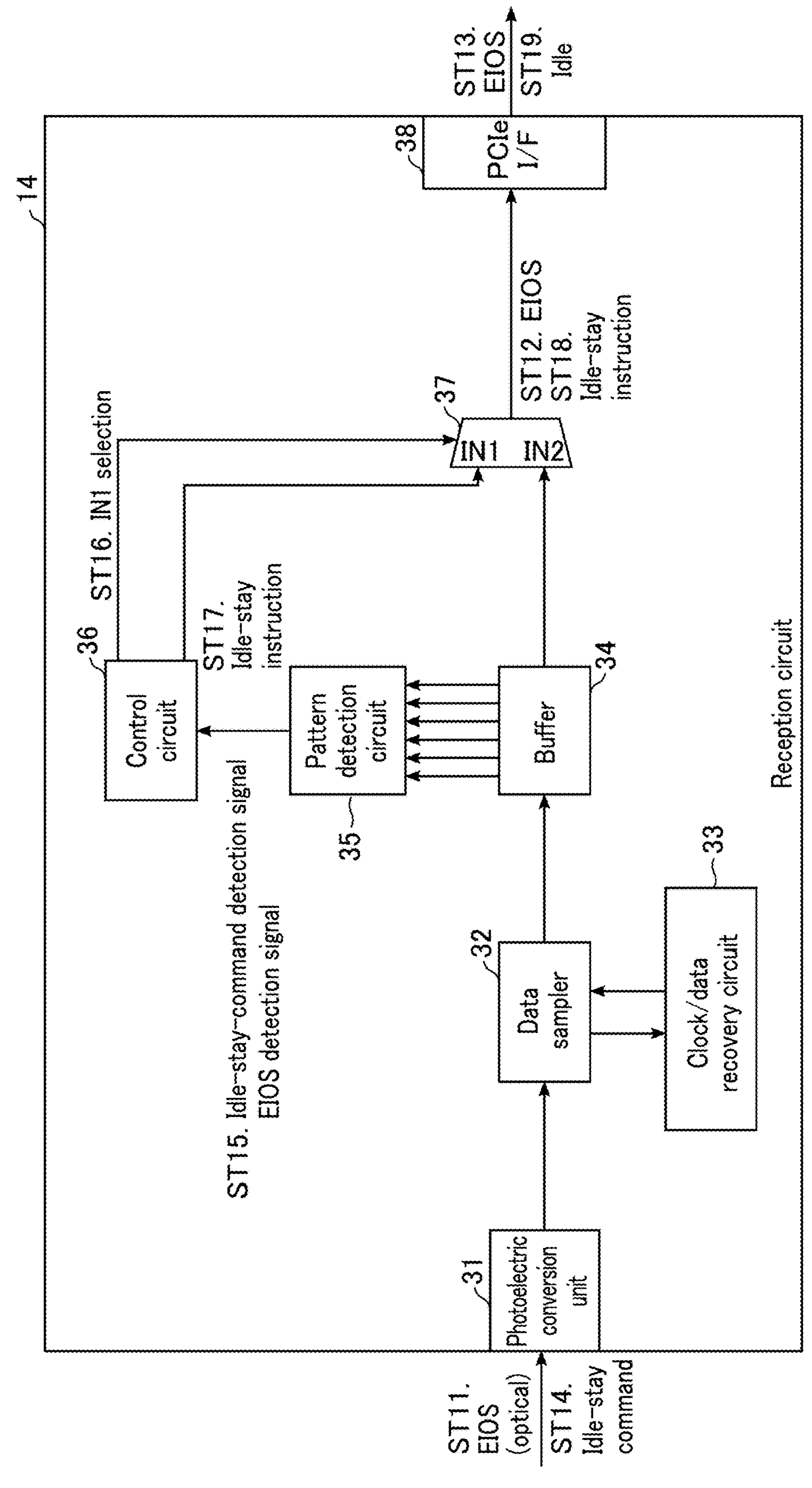
FIG. 7 illustrates signals that are transmitted and received during another operation of the reception circuit of the first embodiment.

FIG. 7 illustrates signals that are transmitted and received during an operation of the reception circuit of the first embodiment. The operation illustrated in FIG. 7 starts when a communication device 3 communicating with the communication device 3 including the reception circuit 14 transmits an EIOS, and, in one example, is performed after the operation illustrated in FIG. 6. At the time of the start of the operation illustrated in FIG. 7, the multiplexer 37 has selected the input IN2.

As illustrated in FIG. 7, the photoelectric conversion unit 31 receives an EIOS in the form of an optical signal (ST11). The EIOS in the form of the optical signal is converted into the form of a PCIe signal.

The converted EIOS is output from the multiplexer 37 (ST12).

Upon receiving the EIOS, the PCIe interface 38 outputs the EIOS (ST13). The EIOS is received by the signal processing circuit 11 coupled to the reception circuit 14. As a result, in a case where the signal processing circuit 11 is ready to enter the L1 mode, the signal processing circuit 11 switches to the L1 mode. In one example, the case where the signal processing circuit 11 is ready to enter the L1 mode includes a case where the signal processing circuit 11 has no data to be transmitted to another circuit communicating with the signal processing circuit 11.

The photoelectric conversion unit 31 receives the EIOS and the idle-stay command EC (ST14).

As the EIOS and the idle-stay command EC are received by the photoelectric conversion unit 31, the pattern detection circuit 35 detects the receipt of the EIOS and the idle-stay command EC. By the detection, the pattern detection circuit 35 outputs an EIOS detection signal EIDS and the idle-stay-command detection signal XDS (ST15).

Upon receiving the EIOS detection signal EIDS and the idle-stay-command detection signal XDS, the control circuit 36 outputs the selection control signal CS2 indicating selection of the input IN1 immediately after the EIOS passes through the input IN2 of the multiplexer 37 (or equivalently, immediately after receipt of the EIOS detection signal EIDS) (ST16).

Upon receiving the idle-stay-command detection signal XDS, the control circuit 36 outputs the idle-stay instruction SI (ST17).

The idle-stay instruction SI is output from the multiplexer 37 (ST18).

As the PCIe interface 38 receives the idle-stay instruction SI, the PCIe interface 38 remains in the idle state (ST19). That is, the PCIe interface 38 outputs no PCIe signal, and maintains an interconnect L2 in a common mode. During the common mode, the pair of interconnects transmitting a differential signal of the interconnect L2 are both maintained at an intermediate potential. The intermediate potential is a potential between the two potentials (which are a high potential and a low potential) that can be taken by interconnects. The interconnects, such as the interconnect L2 and transmitting electrical signals transmit no information while being at the intermediate potential. By maintaining the common mode of the interconnect L2, the signal processing circuit 11 coupled to the reception circuit 14 remains in the L1 mode.

Figure 8:
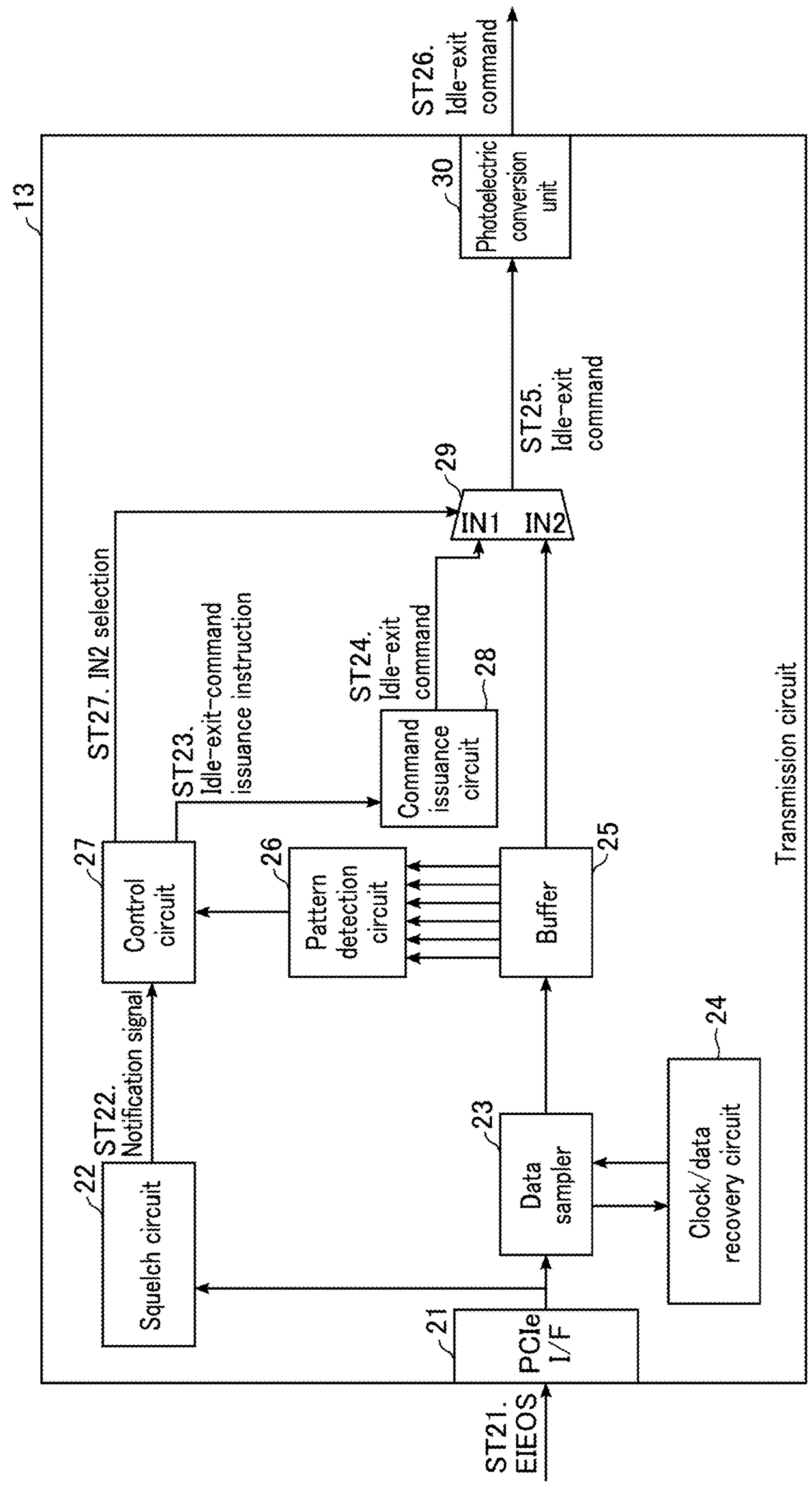
FIG. 8 illustrates signals that are transmitted and received during still another operation of the transmission circuit of the first embodiment.

FIG. 8 illustrates signals that are transmitted and received during an operation of the transmission circuit of the first embodiment. The operation illustrated in FIG. 8 starts when the signal processing circuit 11 coupled to the transmission circuit 13 outputs the EIEOS. At the time of the start of the operation illustrated in FIG. 8, the multiplexer 29 has selected the input IN1. Until immediately before the start of the operation illustrated in FIG. 8, the signal processing circuit 11 coupled to the transmission circuit 13 has been in the L1 mode, and therefore, has been outputting no signal. Accordingly, the PCIe interface 21 has been receiving no signal.

As illustrated in FIG. 8, the PCIe interface 21 receives the EIEOS (ST21).

As the EIEOS is received by the PCIe interface 21, the squelch circuit 22 detects the presence of the signal and outputs the notification signal NS (ST22).

Upon receiving the notification signal NS, the control circuit 27 outputs the idle-exit-command issuance instruction LI (ST23).

Upon receiving the idle-exit-command issuance instruction LI, the command issuance circuit 28 issues the idle-exit command LC (ST24).

The idle-exit command LC is received by the photoelectric conversion unit 30 via the multiplexer 29 (ST25).

Upon receiving the idle-exit command LC, the photoelectric conversion unit 30 outputs the idle-exit command LC in the form of an optical signal (ST26). The idle-exit command LC is a command in the form of the optical signal that can be recognized by the reception circuit 14, and is different from the EIEOS.

After that, the control circuit 27 continues to output the selection control signal CS1 indicating selection of the input IN2 (ST27). In one example, the control circuit 27 can carry out ST27 after the lapse of a time of a predetermined length exceeding the time required since the receipt of the notification signal NS (ST22) till the output of the idle-exit command LC from the multiplexer 29 (ST25).

Figure 9:
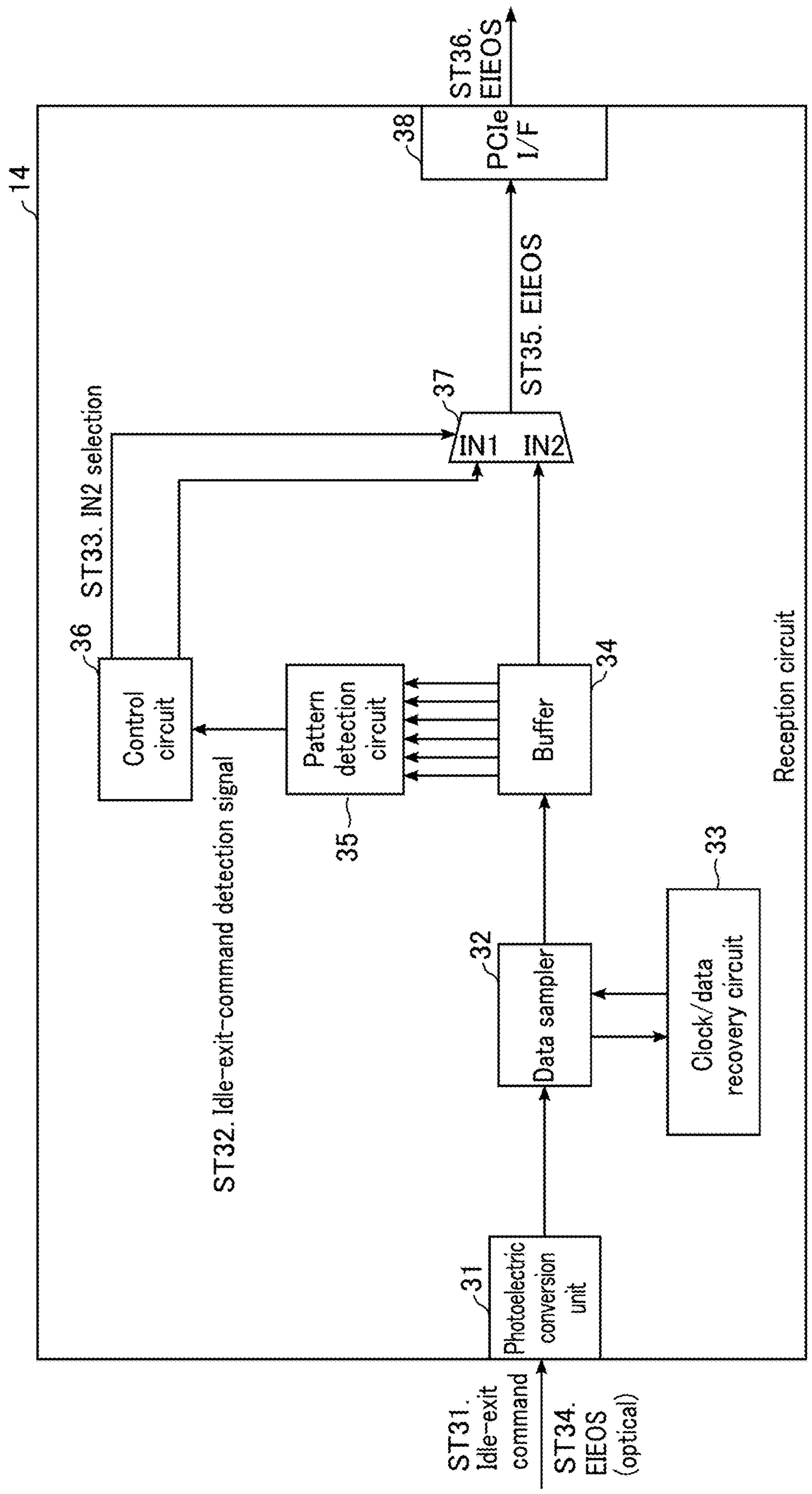
FIG. 9 illustrates signals that are transmitted and received during still another operation of the reception circuit of the first embodiment.

FIG. 9 illustrates signals that are transmitted and received during an operation of the reception circuit of the first embodiment. The operation illustrated in FIG. 9 starts when a communication device 3 communicating with the communication device 3 including the reception circuit 14 transmits the idle-exit command LC, and is performed after the operation illustrated in FIG. 8. At the time of the start of the operation illustrated in FIG. 9, the multiplexer 37 has selected the input IN1.

As illustrated in FIG. 9, the photoelectric conversion unit 31 receives the idle-exit command LC (ST31). The idle-exit command LC in the form of the optical signal is converted into the form of an electrical signal.

The converted idle-exit command LC is detected by the pattern detection circuit 35. By the detection, the pattern detection circuit 35 outputs the idle-exit-command detection signal LDS (ST32).

Upon receiving the idle-exit-command detection signal LDS, the control circuit 36 continues to output the selection control signal CS2 indicating selection of the input IN2 (ST33).

The EIEOS is to be transmitted multiple times according to the PCIe standard, and the photoelectric conversion unit 31 receives the EIEOS in the form of an optical signal (ST34).

The received EIEOS is converted into the form of an electrical signal, and is output from the multiplexer 37 (ST35).

Upon receiving the EIEOS, the PCIe interface 38 outputs the received EIEOS (ST36). The EIEOS is received by the signal processing circuit 11 coupled to the reception circuit 14. As a result, the signal processing circuit 11 switches to the normal mode.

Figure 10:
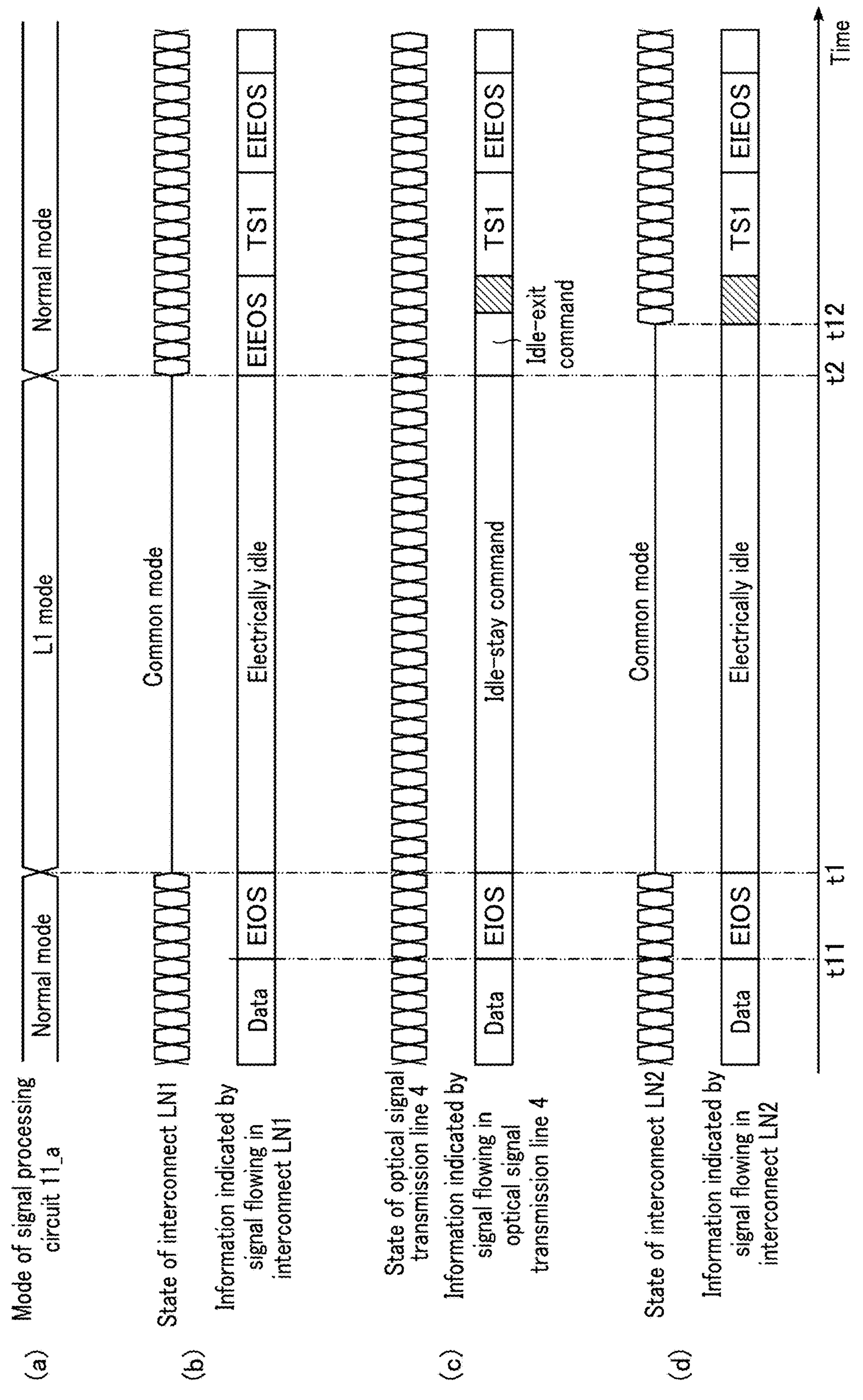
FIG. 10 illustrates states of some components and information indicated by signals flowing in the components during an operation of the transmission circuit and the reception circuit according to the first embodiment.

FIG. 10 illustrates states of some components and information indicated by signals flowing in the components during an operation of the transmission circuit and the reception circuit according to the first embodiment.

FIG. 10 illustrates a boundary period between switching to the L1 mode and exiting from the L1 mode. In the description below, it is assumed that a communication device 3_*a* transmits a signal, and a communication device 3_*b* receives the signal from the communication device 3_*a*. The signal processing circuit 11 of the communication device 3_*a* may be referred to as the signal processing circuit 11_*a*, and the signal processing circuit 11 of the communication device 3_*b* may be referred to as the signal processing circuit 11_*b*. The transmission circuit 13 of the communication device 3_*a* may be referred to as the transmission circuit 13_*a*, and the reception circuit 14 of the communication device 3_*b* may be referred to as the reception circuit 14_*b*.

A portion (a) of FIG. 10 shows the modes of the signal processing circuit 11_*a*. As shown in the portion (a), the signal processing circuit 11_*a* switches from the normal mode to the L1 mode at time t1, and switches from the L1 mode to the normal mode at time t2.

A portion (b) indicates the state of the interconnect LN1 coupling the signal processing circuit 11_*a* and the transmission circuit 13_*a*, and the information indicated by the signal flowing in the interconnect LN1. As shown in the portion (b), the signal processing circuit 11_*a* transmits the EIOS to the transmission circuit 13_*a* from time t11. Time t11 comes before time t1. Until time t1, to transmit data and the EIOS, the interconnect LN1 switches between the high potential and the low potential at the timing based on the data and the EIOS pattern. The drawing illustrates this switching in a simplified manner by showing that the high potential and the low potential are periodically switched.

From time t1 to time t2, the transmission circuit 13_*a* remains in the electrical idle state. Accordingly, the interconnect LN1 remains in the common mode.

The signal processing circuit 11_*a* sequentially transmits the EIEOS, TS1, and EIEOS from time t2. TS1 represents a training sequence. As described above, the EIEOS is repeatedly transmitted multiple times. The training sequence defines an operation for returning to the normal mode. By the transmission of the EIEOS, TS1, and EIEOS, the potential of the interconnect LN1 switches between the high potential and the low potential from time t2.

A portion (c) indicates the state of the optical signal transmission line 4 coupling the transmission circuit 13_*a* and the reception circuit 14_*b*, and the information indicated by the optical signal. As shown in the portion (c), the optical signal transmission line 4 is in a state in which the optical signal transmission line 4 transmits signals until time t1, as in the portion (b). On the other hand, as described above, once transmitting the EIOS, the transmission circuit 13_*a* repeatedly transmits the idle-stay command EC until receiving the EIEOS. The transmission of the idle-stay command EC continues until time t2. Therefore, optical signals are continuously output during the period from time t1 to time t2, which differs from that in the portion (b). The transmission circuit 13_*a* then outputs the idle-exit command LC from time t2, based on the receipt of the EIEOS at time t2.

Since the multiplexer 37 of the transmission circuit 13_*a* selects the input IN1 until the completion of the output, the EIEOS received by the transmission circuit 13_*a* since time t2 is only partially output from the transmission circuit 13_*a*, and does not have the functions as the EIEOS. However, since the EIEOS is repeatedly transmitted, the subsequent EIEOS can serve as a notification of the return to the normal mode. The training sequence TS1 subsequent to the first EIEOS is the same as the portion (b), except that it is the PCIe signal or the optical signal.

A portion (d) indicates the state of the interconnect LN2 coupling the reception circuit 14_*b* and the signal processing circuit 11_*b*, and the information indicated by the signal flowing in the interconnect LN2. As shown in the portion (d), the reception circuit 14_*b* continues to receive the idle-stay command EC from time t1, and thereby maintain the interconnect LN2 in the common mode starting from time t1. As a result, the signal does not flow in the interconnect LN2, and the reception circuit 14_*b* remains in the electrical idle state.

Upon receiving the idle-exit command LC from time t2, the reception circuit 14_*b* exits from the idle state from time t12 after time t2. Accordingly, starting from time t12, the interconnect LN2 exits from the common mode. As described above with reference to the portion (c), the first EIEOS that flows in the interconnect LN1 and is in the form of an optical signal flows only partially in the optical signal transmission line 4, and therefore, the reception circuit 14_*b* does not output the first EIEOS in a complete form to the interconnect LN2. The training sequence TS1 subsequent to the first EIEOS is the same as the portion (c), except that it is the PCIe signal or the optical signal.

1.3. Advantages (Advantageous Effects)

According to the first embodiment, the L1 mode of PCIe can be implemented with an optical signal, as described below.

The PCIe standard defines the L1 mode. The PCIe device on a transmission side notifies the PCIe device on a reception side of continuation of the idle state during the L1 mode, by maintaining the interconnect for transmitting signals in the common mode. Optical signals can be used for the purpose of improving a communication speed between PCIe devices. In this case, an electrical signal from the PCIe device on the transmission side is converted into an optical signal by a photoelectric conversion module, and the optical signal is received by a photoelectric conversion module of the PCIe device on the reception side, and is converted into an electrical signal. That is, an electrical signal from the PCIe device on the transmission side is transmitted to the PCIe device on the reception side via an optical signal. A notification of an idle state is also made with an optical signal. However, there is a lower limit on the frequency of an optical signal. Accordingly, even if the interconnect for transmitting an electrical signal is put into the common mode for the purpose of making a notification of continuation of the idle state of the PCIe device, the optical signal obtained by converting the state operates at the lower limit frequency. Therefore, the photoelectric conversion module coupled to the PCIe device on the reception side is unable to correctly recognize, from the optical signal, the idle state about which a notification is to be made with the optical signal. As a result, the idle state cannot be maintained with the use of the optical signal.

According to the first embodiment, upon receiving the EIOS, the transmission circuit 13 does not convert the post-EIOS common mode state of the interconnect LN1 after the receipt of the EIOS into an optical signal, and outputs the idle-stay command EC to the reception circuit 14 communicating with the transmission circuit 13. The idle-stay command EC can be recognized by the reception circuit 14 communicating with the transmission circuit 13, and notifies that it should remain in the idle state. Since the optical signal generated based on the common mode state is not received by the reception circuit 14, and instead, the idle-stay command EC is received by the reception circuit 14, the reception circuit 14 can correctly recognize the notification that it should remain in the idle state.

According to the first embodiment, the transmission circuit 13 includes the squelch circuit 22. As the EIEOS is transmitted in a state in which the interconnect LN1 is in the common mode, the squelch circuit 22 detects the EIEOS. By the detection of the EIEOS, the transmission circuit 13 outputs the idle-exit command LC to the reception circuit 14 communicating with the transmission circuit 13. The idle-exit command LC can be recognized by the reception circuit 14 communicating with the transmission circuit 13, and notifies that it should exit from the idle state. Also, by the detection of the EIEOS, the reception circuit 14 switches to a mode in which the PCIe signal is output in the form of an optical signal. As a result, the transmission circuit 13 can switch to a mode in which the PCIe signal can be output in the form of an optical signal, in synchronization with the switching of the interconnect LN1 from the idle state to the normal state.

According to the first embodiment, the reception circuit 14 recognizes the idle-stay command EC, and, upon receiving the idle-stay command EC, puts the interconnect LN2 into the idle state. As a result, it is possible to notify the signal processing circuit 11 coupled to the reception circuit 14 that it should remain in the idle state.

According to the first embodiment, as the reception circuit 14 recognizes the idle-exit command LC and receives the idle-exit command LC, the mode is switched to a mode in which the EIEOS is transmitted to the signal processing circuit 11 coupled to the reception circuit 14, and the PCIe signal is output in the form of an electrical signal. As a result, the reception circuit 14 causes the signal processing circuit 11 coupled to the reception circuit 14 to switch to the normal mode. That is, according to the first embodiment, the information indicated by the electrical signal from the signal processing circuit 11 coupled to the transmission circuit 13 can be correctly transmitted to the signal processing circuit 11 coupled to the reception circuit 14, via the optical signal.

1.4. Examples of Applications

Figure 11:
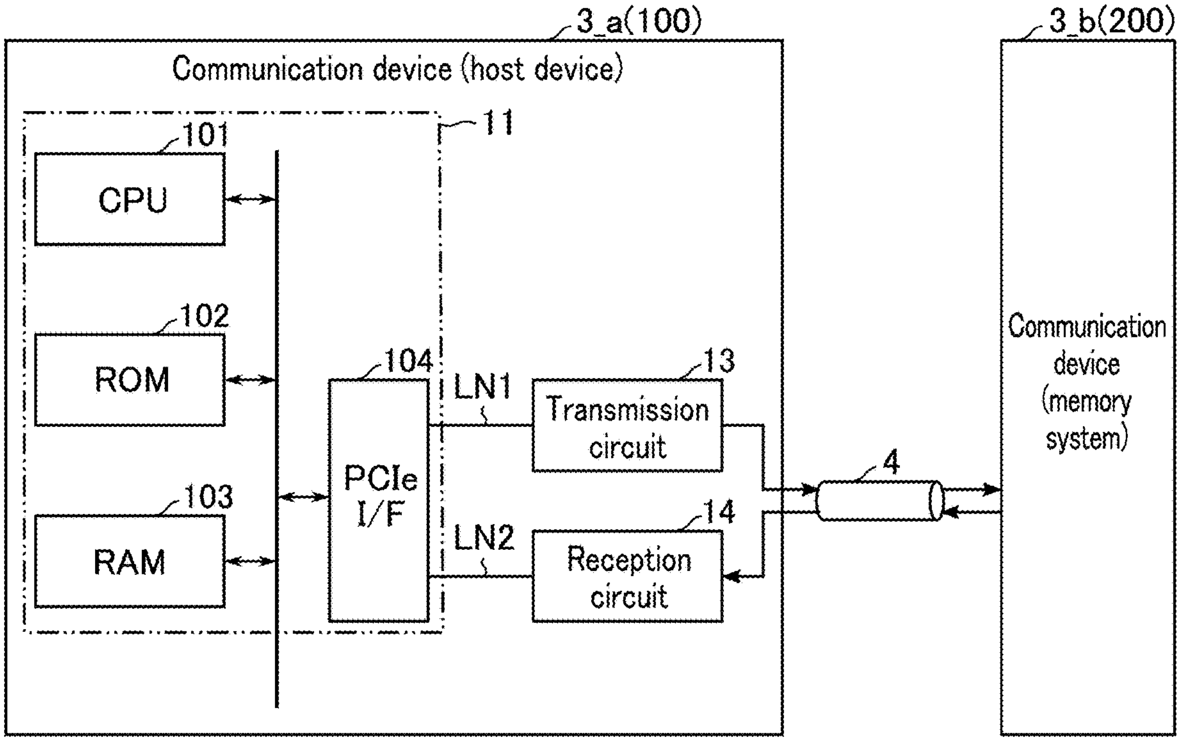
FIG. 11 illustrates an example application of the transmission circuit and the reception circuit according to the first embodiment.

FIG. 11 illustrates an example application of the transmission circuit and the reception circuit according to the first embodiment. FIG. 11 illustrates an application of the communication device 3 of the first embodiment to a host device, and is a block diagram of the host device.

As shown in FIG. 11, the communication device 3_a is the host device, and the communication device 3_b is a memory system. Hereinafter, the communication device 3_a will be referred to as a host device 100, and the communication device 3_b will be referred to as a memory system 200. The communication device 3_a is configured to be connectable to the communication device 3_b via the optical signal transmission line 4.

The host device 100 is a device that processes data using the memory system 200. Examples of the host device 100 include a personal computer, and a server in a data center. The signal processing circuit 11 of the host device 100 includes a CPU 101, a read only memory (ROM) 102, a random access memory (RAM) 103, and a PCIe interface 104. The CPU 101, the ROM 102, the RAM 103, and the PCIe interface 104 are coupled so as to be able to communicate with one another.

The CPU 101 is a circuit that controls entire operations of the host device 100. As a firmware that is stored in the ROM 102 and has been loaded onto the RAM 103 is executed by the CPU 101, the host device 100 performs various operations.

The ROM 102 is a nonvolatile memory. The ROM 102 stores a program including the firmware.

The RAM 103 is a volatile memory. The RAM 103 temporarily stores data, and stores the program stored in the ROM 102 while the host device 100 is supplied with power. The RAM 103 also functions as a buffer memory.

The PCIe interface 104 is a component including a circuit, a terminal, and a firmware for transmitting and receiving the PCIe signal. The PCIe interface 104 includes a terminal compliant with the PCIe standard. The PCIe interface 104 can be coupled to an interconnect (or a connector) compliant with the PCIe standard by the terminal. The PCIe interface 104 can be physically and electrically coupled to another device compliant with the PCIe standard by the interconnect. The PCIe interface 104 is coupled to the transmission circuit 13 by the interconnect LN1. The PCIe interface 104 is coupled to the reception circuit 14 by the interconnect LN2.

Figure 12:
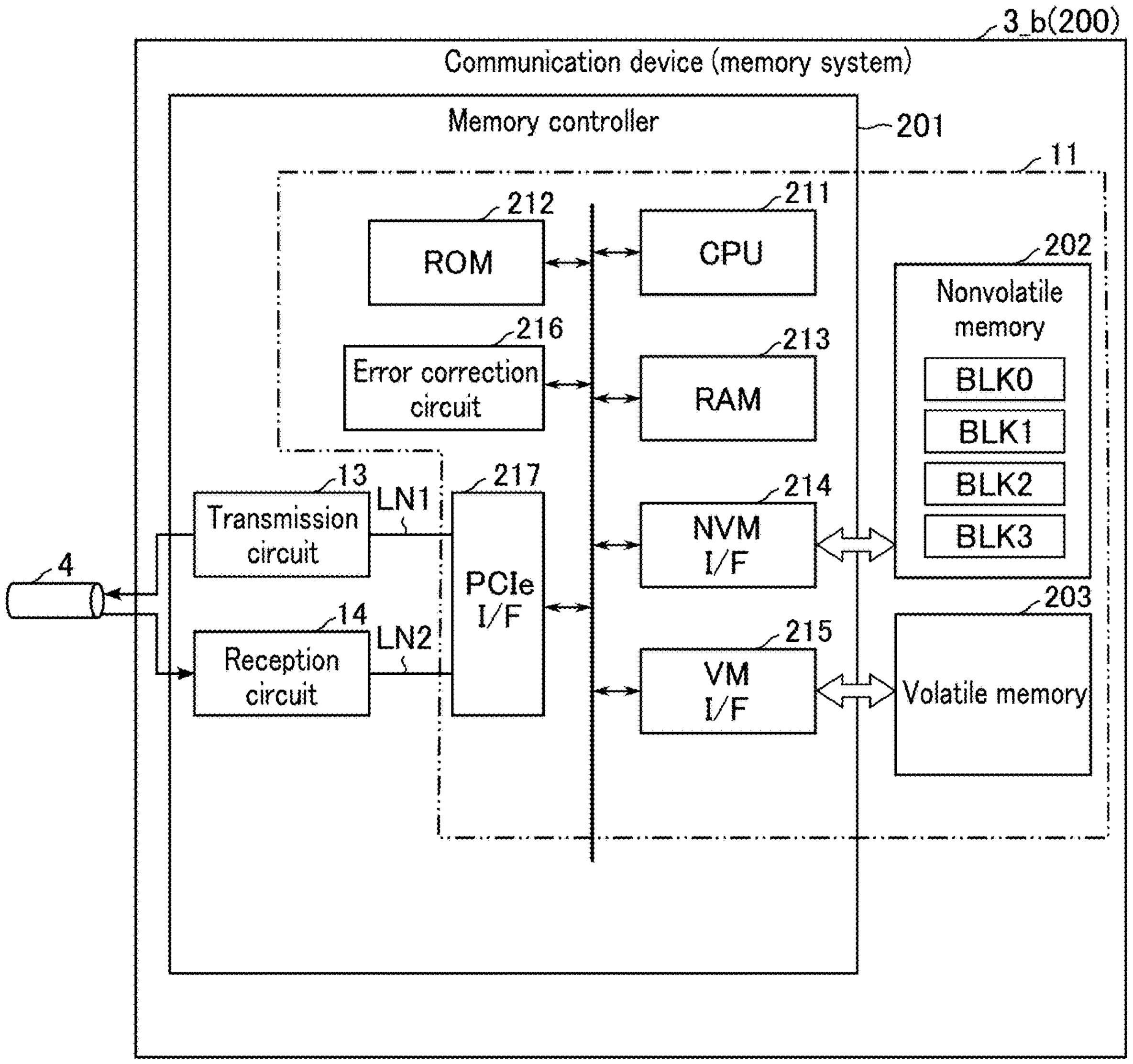
FIG. 12 illustrates another example application of the transmission circuit and the reception circuit according to the first embodiment.

FIG. 12 illustrates another example application of the transmission circuit and the reception circuit according to the first embodiment. FIG. 12 illustrates an application of the communication device 3 according to the first embodiment to a memory system 200, and is a block diagram of the memory system 200.

The memory system 200 is a device that stores data. Examples of the memory system 200 include a memory card such as an SD™ card, a universal flash storage (UFS) device, and a solid-state drive (SSD). The memory system 200 stores data, reads data, and erases data, in response to a request from the host device 100. The memory system 200 can store, read, and erase data, not based on the request from the host device 100.

The memory system 200 includes a memory controller 201, a nonvolatile memory 202, and a volatile memory 203.

Examples of the nonvolatile memory 202 include a NAND flash memory. The nonvolatile memory 202 includes a plurality of blocks BLK (BLK0 to BLK3). Each block BLK includes a plurality of memory cells. Each memory cell stores data in a nonvolatile manner. In one example, the blocks BLK are units of data erasing.

Examples of the volatile memory 203 include a dynamic random access memory (DRAM). The volatile memory 203 stores information such as information regarding the read voltage to be used when data is read from the nonvolatile memory 202.

The memory controller 201 is a controller that controls the nonvolatile memory 202. Examples of a form of the memory controller 201 include an integrated circuit such as a system-on-a-chip (SoC). The memory controller 201 controls the nonvolatile memory 202 so as to perform a process requested from the host device 100. Specifically, the memory controller 201 writes write data to the nonvolatile memory 202 in response to a write request from the host device 100. The memory controller 201 reads read data from the nonvolatile memory 202 and transmits data based on the read data to the host device 100, in response to a read request from the host device 100.

The memory controller 201 includes a CPU 211, a ROM 212, a RAM 213, a nonvolatile memory interface (NVMI/F) 214, a volatile memory interface (VMI/F) 215, an error correction circuit 216, and a PCIe interface 217. The CPU 211, the ROM 212, the RAM 213, the nonvolatile memory interface 214, the volatile memory interface 215, the error correction circuit 216, and the PCIe interface 217 are coupled so as to be able to communicate with one another.

The CPU 211 is a circuit that controls entire operations of the memory controller 201. As a firmware that is stored in the ROM 212 and has been loaded onto the RAM 213 is executed by the CPU 211, the memory controller 201 performs various operations. The firmware is configured to enable the CPU 211 to perform the operations described in the embodiment, and implement the functional blocks described in the embodiment.

The ROM 212 is a nonvolatile memory. Examples of the ROM 212 include an electrically erasable programmable read only memory (EEPROM™). The ROM 212 stores a program including the firmware.

The RAM 213 is a volatile memory. The RAM 213 temporarily stores data, and stores the program stored in the ROM 212 while the memory system 200 is supplied with power. Examples of the RAM 213 include a dynamic random access memory (DRAM) and a static random access memory (SRAM). The RAM 213 also functions as a buffer memory.

The nonvolatile memory interface 214 is an interface for the memory controller 201 to communicate with the nonvolatile memory 202. The nonvolatile memory interface 214 includes hardware, or a set of hardware and software. The nonvolatile memory interface 214 is coupled to the nonvolatile memory 202 by an interconnect for enabling communication of a scheme based on a type of the nonvolatile memory 202. The nonvolatile memory interface 214 transmits a command, address information, and write data to the nonvolatile memory 202, and receives read data from the nonvolatile memory 202. The nonvolatile memory interface 214 transmits various control signals for controlling the nonvolatile memory 202, to the nonvolatile memory 202.

The volatile memory interface 215 is an interface for the memory controller 201 to communicate with the volatile memory 203. The volatile memory interface 215 includes hardware, or a set of hardware and software. The volatile memory interface 215 is coupled to the volatile memory 203 by an interconnect for enabling communication of a scheme based on the type of the volatile memory 203. In one example, the volatile memory interface 215 is compliant with a DRAM interface standard.

The error correction circuit 216 is a circuit that performs a process for detecting and correcting an error in data to be written to the nonvolatile memory 202, and detects and corrects an error in data read from the nonvolatile memory 202. The error correction circuit 216 may be formed as an independent dedicated semiconductor chip, may be a circuit formed on a semiconductor substrate, or may be realized by the CPU 211 executing a firmware. The error correction circuit 216 generates an error correction code from data (substantial write data) to be written to the nonvolatile memory 202. The error correction code generated from the substantial write data is added to the actual write data, based on the method for generating the error correction code. The substantial write data and the error correction code generated from the substantial write data are written to the nonvolatile memory 202. The error correction circuit 216 decodes read data, using the error correction code.

The PCIe interface 217 is a component including a circuit, a terminal, and a firmware for transmitting and receiving the PCIe signal. The PCIe interface 217 includes a terminal compliant with the PCIe standard. The PCIe interface 217 can be coupled to an interconnect (or a connector) compliant with the PCIe standard by the terminal. The PCIe interface 217 can be physically and electrically coupled to another device compliant with the PCIe standard by the interconnect. The PCIe interface 217 is coupled to the transmission circuit 13 by the wiring line interconnect LN1. The PCIe interface 217 is coupled to the reception circuit 14 by the interconnect LN2.

The interfaces described so far using PCIe as an example may be of universal chip interconnect express (UCIe).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmission circuit comprising:

an interface that is compliant with a first standard specifying transmission of a signal in a serial format, and is configured to receive an electrical signal in the serial format;

a control circuit configured to output a first issuance instruction upon detecting that a first command for instructing a device compliant with the first standard to switch to an idle state is received by the interface; and a photoelectric conversion device configured to convert a received electrical signal into an optical signal and output the optical signal, and, upon receiving the first issuance instruction, output a second command which indicates instruction to switch to the idle state and is in a form of an optical signal.

2. The transmission circuit according to claim 1, further comprising:

a detection circuit that is coupled to the interface, and is configured to output a first signal upon detecting receipt of the electrical signal in the serial format by the interface that has not been receiving the electrical signal in the serial format, wherein the control circuit is further configured to output a second issuance instruction upon receiving the first signal; and the photoelectric conversion device is further configured to output a third command which indicates instruction to exit from the idle state and is in a form of an optical signal upon receiving the second issuance instruction.

3. The transmission circuit according to claim 2, wherein the control circuit is further configured to, upon receiving the first signal, switch to a state in which the electrical signal received by the interface is transferred to the photoelectric conversion device.

4. A communication device comprising:

the transmission circuit according to claim 1; and a signal processing circuit that transmits a signal to the interface.

5. A communication device comprising:

the transmission circuit according to claim 2; and a signal processing circuit that transmits a signal to the interface.

6. A communication device comprising:

the transmission circuit according to claim 3; and a signal processing circuit that transmits a signal to the interface.

7. A reception circuit comprising:

a photoelectric conversion device configured to convert a received optical signal into an electrical signal, and output the electrical signal;

a control circuit configured to output a first issuance instruction upon detecting that the photoelectric conversion device has received a first command and a second command for instructing a device compliant with a first standard to switch to an idle state, the first standard specifying transmission of a signal in a serial format; and an interface that is compliant with the first standard, is configured to output an electrical signal in a serial format, and, upon receiving the first issuance instruction, maintain an output of an electrical signal in a common mode.

8. The reception circuit according to claim 7, wherein the control circuit is further configured to, upon the photoelectric conversion device receiving the second command after receiving the first command, switch to a state in which an electrical signal based on an optical signal received by the photoelectric conversion device later than the second command is transferred to the interface.

9. A communication device comprising:

the reception circuit according to claim 7; and a signal processing circuit that receives a signal from the interface, and processes the received signal.

10. A communication device comprising:

the reception circuit according to claim 8; and a signal processing circuit that receives a signal from the interface, and processes the received signal.

11. A transmission and reception circuit comprising:

the transmission circuit according to claim 1;

a second photoelectric conversion device configured to convert a received optical signal into an electrical signal, and output the electrical signal;

a second control circuit configured to output a second issuance instruction upon detecting that the second photoelectric conversion device has received a third command and a fourth command for instructing a device compliant with the first standard to switch to an idle state; and a second interface that is compliant with the first standard, is configured to output an electrical signal in a serial format, and, upon receiving the second issuance instruction, maintain an output of an electrical signal in a common mode.

12. The transmission and reception circuit according to claim 11, further comprising:

a detection circuit that is coupled to the interface, and is configured to output a first signal upon detecting receipt of the electrical signal in the serial format by the interface that has not been receiving the electrical signal in the serial format, wherein the control circuit is further configured to output a third issuance instruction upon receiving the first signal; and the photoelectric conversion device is further configured to output a fifth command which indicates instruction to exit from the idle state and is in a form of an optical signal upon receiving the third issuance instruction.

13. The transmission and reception circuit according to claim 12, wherein the control circuit is further configured to, upon receiving the first signal, switch to a state in which the electrical signal received by the interface is transferred to the photoelectric conversion device.

14. The transmission and reception circuit according to claim 11, wherein the second control circuit is further configured to, upon the second photoelectric conversion device receiving a fifth command after receiving the third command, switch to a state in which an electrical signal based on an optical signal received by the second photoelectric conversion device later than the fifth command is transferred to the second interface.

15. A communication device comprising:

the transmission and reception circuit according to claim 11; and a signal processing circuit that transmits a signal to the interface, and receives a signal from the second interface.

16. A communication device comprising:

the transmission and reception circuit according to claim 12; and a signal processing circuit that transmits a signal to the interface, and receives a signal from the second interface.

17. A communication device comprising:

the transmission and reception circuit according to claim 13; and a signal processing circuit that transmits a signal to the interface, and receives a signal from the second interface.

18. A communication device comprising:

the transmission and reception circuit according to claim 14; and a signal processing circuit that transmits a signal to the interface, and receives a signal from the second interface.

* * * * *